Dec. 6, 1938.   W. W. TRICKEY   2,138,946
METHOD FOR SEALING PIPE JOINTS
Filed June 10, 1936
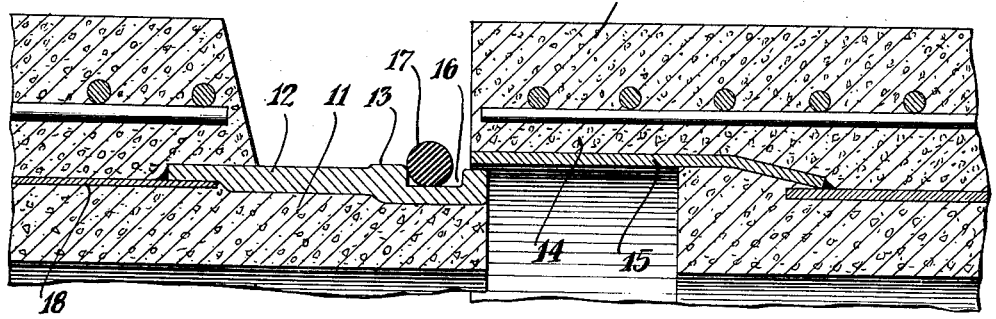
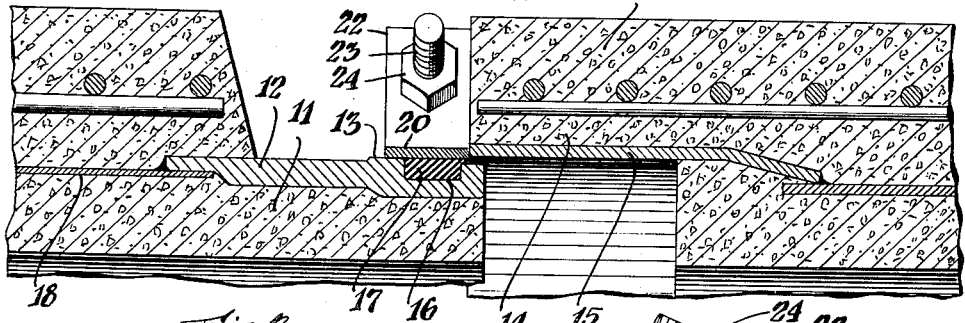
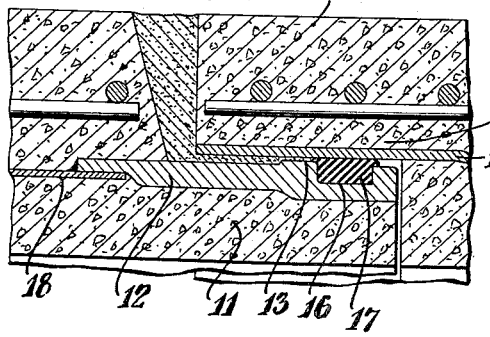
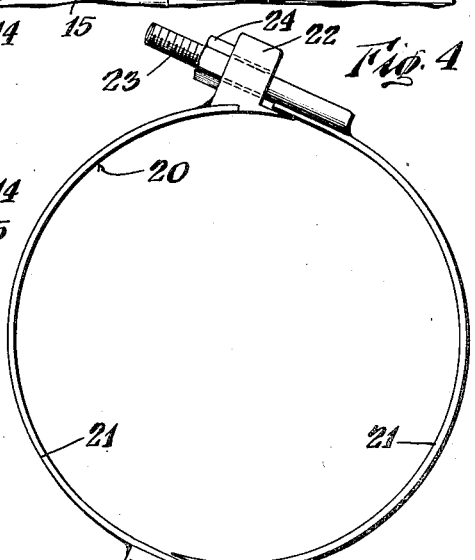
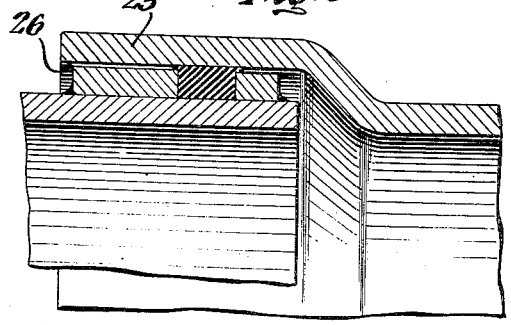
INVENTOR
William W. Trickey
BY
Cooper, Kerr & Dunham
ATTORNEYS Patented Dec. 6, 1938

2,138,946

UNITED STATES PATENT OFFICE 2,138,946

METHOD FOR SEALING PIPE JOINTS

William W. Trickey, Verona, N. J., assignor to Lock Joint Pipe Company, East Orange, N. J., a corporation of New Jersey Application June 10, 1936, Serial No. 84,417

1 Claim. (Cl. 29—88.2)

This invention relates to a method for sealing a bell and spigot joint and particularly to a method for introducing a gasket within a joint which has closely associated bearing surfaces with no provision for enabling the seating of a gasket in a gasket-retaining groove.

It is desirable that the opposite surfaces of a bell and spigot joint fit as closely together as they can be made to fit under practical conditions in order that the sealing gasket be compressed uniformly throughout. When the joint is designed to accomplish this, and at the same time provide protection for the gasket, the gasket may consist simply of a band of material which has excellent sealing properties made durable for a long time by encasement. To enable the use of but one sealing medium is a very desirable advantage, and I have found that assurance of maintaining such a joint closed under adverse conditions can be enhanced without additional expense or increase in the quantity of material used. It is among the objects of the invention to accomplish this by providing a method for introducing a compressible or elastic gasket within a joint whereby practically all of the area of the joint member which is opposite the joint member carrying the gasket is made capable of use and available as a bearing surface, in contradistinction to the conditions present when the effective length of a joint is restricted to an area of less length than either the spigot or bell because of the non-availability for use for bearing purposes of a portion of the area of the joint member which is opposite the joint member carrying the gasket.

Another object of the invention is to increase the effective length of a pipe joint without requiring an increase in the amount of steel used in the joint portions of a pipe or in the over-all length of a pipe by providing auxiliary means by which the gasket may be compressed independently of either the bell or spigot bearing surface.

I am able to accomplish the objects of this invention by the employment of an auxiliary element in the form of a pilot ring by which the gasket is deformed and its outer diameter is decreased until it is reduced to at least the circumferential dimension the gasket will have when enclosed in the finished joint. When the gasket has been compressed by the application of pressure throughout its circumference, the gasket is introduced within the bell of the joint by substituting the inner surface of the bell for the inner surface of the pilot ring so as to maintain the gasket in its compressed state as it enters the bell when the joint is being closed. After the bell has passed beyond the compressed gasket the pilot ring is removed and the closing of the joint is completed. This enables the entire inner bearing surface of the bell to be made cylindrical and serve as an effective bearing surface of the joint. In addition to increasing the effective length of the joint without increasing the cost of manufacturing the pipe, the invention has other objects which will appear more fully from the accompanying description.

In the drawing, Fig. 1 is a portion of a longitudinal section of the bell and spigot of an open pipe joint.

Fig. 2 is a similar view showing one form of an auxiliary element or pilot ring by which the gasket may be forced into its retaining groove.

Fig. 3 shows a longitudinal view of a portion of the joint when closed.

Fig. 4 is a side view of the auxiliary element or pilot ring illustrated in Fig. 2.

Fig. 5 illustrates a form of steel or cast iron pipe joint utilizing the principle of the invention.

The effective length of a pipe joint of the bell and spigot type includes the length of the joint having opposite surfaces which are in contact or capable of being in contact with each other. In the joint illustrated in the drawing this effective length includes the length of the interior surface of the bell from and including the innermost location of the gasket to the extreme end of the mouth of the bell.

The pipe joint illustrated in Figs. 1, 2 and 3 is of a type suitable for use in concrete pipe. When the ends of connecting pipes are joined the bell 10 of one pipe extends over the spigot 11 of another pipe.

The spigot has a bearing ring 12, usually made of steel and providing a bearing surface 13, which is of slightly less diameter than the bearing surface 14 of the bell. This is to assure that the gasket which is to be contained in the joint will be protected to the fullest extent possible from the atmosphere and that the bearing surfaces of the joint will remain concentric to each other and cause uniform pressure to be exerted upon all portions of the gasket. The bearing surface of the bell extends from the mouth end of the bell to opposite the portion thereof which is engaged by the gasket. This is provided by the inner surface of a steel bearing ring 15, but the interior of the bell, as well as the exterior of the spigot, may be made of concrete or of other material, if desired.

The spigot bearing ring has a groove 16 therein for receiving the gasket 17. The spigot and bell bearing rings are preferably attached to the reinforcing of the pipe, such as, for example, a reinforcing cylinder 18.

The diameter of the inner surface of the bell bearing ring and the diameter of the outer surface of the spigot bearing ring are of such dimensions as to permit the two members to engage snugly when the joint is closed. The bearing surfaces are cylindrical and are made as nearly the same diameter as is practical for the kind of pipe with which the joint is used. Under these conditions rubber may be used as the sole sealing medium for the joint, as explained in my United States Patent No. 1,976,589, but while I prefer rubber, other materials having sealing properties like rubber may be used if desired.

The gaskets which are used to seal the joint may have any cross-sectional shape desired, it being necessary only that the cross-sectional area of the gasket in its natural state does not exceed that which can be confined within the groove or space provided therefor when the gasket is compressed and the joint is closed. One cross-sectional form for a rubber gasket which has proved satisfactory is illustrated in Fig. 1 in its natural condition, and in Figs. 2 and 3 in its compressed condition. In selecting the form of the gasket it is to be kept in mind that rubber may be fairly readily distorted or deformed, but even when appreciable pressure is applied thereon it occupies very closely the same volumetric capacity as before compression.

In practicing my method a band of rubber or like material is inserted within the groove 16. This may be attached by either passing a closed band over the end of the spigot or by cutting a strip of gasket material to the necessary length and splicing the ends so that the band formed thereby will remain within the groove. The bell and spigot ends are brought opposite each other to assume the general relation illustrated in Fig. 1. I then employ an auxiliary element which may be made in any form capable of compressing the gasket to substantially the form it will remain in when confined within the joint. I term this auxiliary element a pilot ring and have illustrated a suitable form in the drawing by way of example (Figs. 2 and 4). While the inner surface 20 of the pilot ring may be tapered toward the bell of the pipe, I prefer a ring with a cylindrical surface.

The pilot ring is expanded enough to enable its placing about the outer circumference of the gasket. The pilot ring I have chosen to illustrate is made up in the form of two like semi-circular bands, each consisting of a band of steel 21 carrying at one end a boss 22 and carrying at its other end a stud 23 which passes through a hole in the boss and is engaged by a nut 24. When the nuts are tightened upon the ends of the bands, the circumference of the pilot ring is contracted. As the nuts are tightened the pilot ring exerts a gradually increasing radial pressure which forces the band into its retaining groove, as shown in Fig. 2. The nuts are tightened until the circumference of the gasket is reduced to at least the inner circumference of the bell bearing surface 14. The bell is made to maintain the initially compressed condition of the gasket by substituting the inner surface of the bell for the inner surface of the pilot ring. This is accomplished as the bell is moved into engagement with the spigot and the pilot ring is slipped from over the gasket by the advancing bell. After the forward edge of the bell has advanced to a point beyond the far side of groove 16 and completely covers the gasket the pilot ring is removed and the joint is completed by shoving the bell home over the spigot, as illustrated in Fig. 3. It will be seen from this view that the inner bearing surface of the bell provides a cylindrical portion extending materially beyond the encased gasket.

In Fig. 5 I have illustrated a form of joint made possible by my present invention for either cast iron or steel pipes. As in the joint illustrated in Figs. 1, 2 and 3, the metallic pipe joint has a bell 25 having a relatively long cylindrical bearing surface 26.

The length of the inner bearing surface of the bell determines the expanse of surface available for maintaining the joint closed and because of this it is desirable to provide as long a surface as is possible without sacrifice of economy. It frequently happens that pipe which is laid in the ground, and particularly heavy pipe which is used to conduct water, settles and the joints slide upon one another. Pipe joints made in accordance with the principles of my invention are provided with additional length of effective bearing surface in the joint without corresponding increase in cost of manufacture.

What is claimed is:

The method of sealing a bell and spigot pipe joint which comprises the steps of mounting within a groove upon the exterior of the spigot a gasket in the form of a ring of rubber or rubber-like material having a cross-section requiring deformation for its encasement within the joint to be formed, applying pressure inwardly upon the gasket throughout its circumference by the use of a circumferentially closed pilot ring and thereby changing the cross section of the material of the gasket against its inherent form-restorative property and causing reduction in its thickness and the entry of a greater portion of the gasket into the retaining groove upon the exterior of the spigot as the pressure is increased, continuing the application of pressure until contraction of the outer circumference of the gasket has progressed to at least the dimension the gasket will have when enclosed within the finished joint, and introducing the gasket within the bell of the joint by axially displacing the ring by the bell and thus substituting the inner surface of the bell for the inner surface of the pilot ring while maintaining the gasket in its deformed state as the joint is being closed.

WILLIAM W. TRICKEY.